United States Patent
Yi et al.

(10) Patent No.: US 10,189,217 B2
(45) Date of Patent: Jan. 29, 2019

(54) METHOD FOR PREPARING THERMOPLASTIC PREPREG AND THERMOPLASTIC PREPREG PREPARED THEREBY

(71) Applicant: KOLON INDUSTRIES, INC., Gwacheon-si, Gyeonggi-do (KR)

(72) Inventors: Jee Sung Yi, Yongin-si (KR); Eun Jeong Cho, Yongin-si (KR); Joon Young Yoon, Yongin-si (KR); Hyun Chul Lee, Yongin-si (KR); Chung Seock Kang, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/125,684

(22) PCT Filed: Apr. 7, 2015

(86) PCT No.: PCT/KR2015/003442
§ 371 (c)(1),
(2) Date: Sep. 13, 2016

(87) PCT Pub. No.: WO2015/156564
PCT Pub. Date: Oct. 15, 2015

(65) Prior Publication Data
US 2017/0001385 A1  Jan. 5, 2017

(30) Foreign Application Priority Data
Apr. 8, 2014 (KR) .................. 10-2014-0041604

(51) Int. Cl.
*C08J 5/24* (2006.01)
*B29B 15/12* (2006.01)
*B29C 70/50* (2006.01)
*B29K 101/12* (2006.01)
*B29K 105/08* (2006.01)

(52) U.S. Cl.
CPC ............ *B29C 70/506* (2013.01); *B29B 15/12* (2013.01); *C08J 5/24* (2013.01); *B29K 2101/12* (2013.01); *B29K 2105/089* (2013.01); *B29K 2995/004* (2013.01); *C08J 2300/22* (2013.01); *C08J 2323/06* (2013.01); *C08J 2367/00* (2013.01); *C08J 2377/00* (2013.01); *C08J 2477/00* (2013.01)

(58) Field of Classification Search
CPC ... B29B 15/12; B29C 70/506; B29K 2101/12; B29K 2105/089; B29K 2995/004; C08J 2300/22; C08J 2323/06; C08J 2367/00; C08J 2377/00; C08J 2477/00; C08J 5/24
See application file for complete search history.

(56) References Cited

U.S. PATENT DOCUMENTS 3,444,732 A * 5/1969 McKinley ............... B29C 65/18
156/378

FOREIGN PATENT DOCUMENTS

| JP | 06-091817 A | 4/1994 |
|---|---|---|
| JP | 2005-239843 A | 9/2005 |
| JP | 2013-103481 A | 5/2013 |
| JP | 2014-047344 A | 3/2014 |
| KR | 10-2009-0049446 A | 5/2009 |

OTHER PUBLICATIONS

English translation of written opinion of WO2015/156564.*
English translation of JP0691817.*
International Searching Authority, International Search Report of PCT/KR2015/003442 dated Jun. 15, 2015 [PCT/ISA/210].

* cited by examiner

*Primary Examiner* — Sonya M Sengupta
(74) *Attorney, Agent, or Firm* — Sughrue Mion, PLLC

(57) ABSTRACT

A method for preparing a high quality thermoplastic prepreg, includes: laminating a thermoplastic resin film having a crystallization degree in a range of 1 to 20% on at least one surface of a matrix fiber; and heating the laminate to a higher temperature than a melting point of the film, then, pressing the same. The method uniformly impregnates a matrix fiber with a thermoplastic resin, has a short curing cycle in the formation, and involves no random modification in alignment of fibers in the matrix fiber due to a low crystallization degree of the impregnated thermoplastic resin, thereby increasing rigidity of a formed product and enabling reduction of thickness. Thus produced prepreg has a low weight variation per unit area.

9 Claims, No Drawings

METHOD FOR PREPARING THERMOPLASTIC PREPREG AND THERMOPLASTIC PREPREG PREPARED THEREBY

CROSS REFERENCE TO RELATED APPLICATIONS

This application is a National Stage of International Application No. PCT/KR2015/003442, filed Apr. 7, 2015, claiming priority based on Korean Patent Application No. 10-2014-0041604, filed Apr. 8, 2014, the contents of all of which are incorporated herein by reference in their entirety.

TECHNICAL FIELD

The present invention relates to a method for preparing a thermoplastic prepreg and the thermoplastic prepreg prepared thereby. More particularly, the present invention relates to a method for preparing a thermoplastic prepreg wherein a matrix fiber is uniformly impregnated with a thermoplastic resin and alignment of fibers in the matrix fiber is not randomly modified, thus physical properties of a formed product may be improved and a thickness thereof may be decreased, as well as the thermoplastic prepreg prepared by the same.

The prepreg is a material composed of a matrix fiber impregnated with thermosetting resins or thermoplastic resins, and is generally used as a forming material for various products.

BACKGROUND ART

Among conventional methods for preparing prepregs, a process of preparing a thermosetting prepreg by impregnating a matrix fiber with thermosetting resins such as an epoxy resin, phenol resin, unsaturated polyester resin, etc. has been widely used in the art.

The above conventional method has an advantage of easily conducting impregnation since the thermosetting resin has a low viscosity at an impregnation temperature of about 80° C. to 100° C., however, entailing problems such that, due to features of the thermosetting resin, the resin cannot be recycled after curing, and has a relatively short storage period of thermosetting prepregs.

As another conventional technique to solve the above problems, a method for preparing a thermoplastic prepreg by impregnating a matrix fiber with a thermoplastic resin has also been employed.

However, due to a high viscosity property of the thermoplastic resin, the above method would need heat treatment at a high temperature of 200° C. or more in order to impregnate a matrix fiber with a thermoplastic resin. For this reason, tarr is generated in great quantities during heating at a high temperature, and stickiness occurs and deteriorates a quality of prepreg. Further, since the thermoplastic resin has a relatively higher viscosity during heating at a high temperature, it is difficult to uniformly impregnate the matrix fiber with the resin, which in turn, increases a porosity in the prepreg, hence causing a problem of not expressing sufficient performance.

In spite of such problems as described above, the thermoplastic prepreg may be recycled and a curing cycle in the formation is very short such as 10 minutes or less, thus achieving advantages for mass production. Accordingly, research and development thereof have been conducted.

Particular techniques known in the art for preparing a thermoplastic prepreg may include, for example, a powder method, monomer method, co-mingle method or extrusion method, or the like.

The monomer method is a process of uniformly impregnating a matrix fiber with thermoplastic resin monomer having a low viscosity, introducing a cross-linking agent therein, and curing the same. In recent years, a thermoplastic prepreg formed by impregnating a matrix fiber with a thermoplastic resin such as polybutylene terephthalate, polyamide 6, etc. has been proposed. However, since a polymer molecular weight is not great due to a short curing time of 5 to 30 minutes, the above prepreg has deteriorated physical properties without sufficiently expressing advantages of the thermoplastic resin. However, by utilizing some advantages such as a high strength of the matrix fiber, relatively larger resin molecular weight, uniformity, and short formation time, etc., the range of application and usage thereof is currently increasing.

The co-mingle method is a process of uniformly admixing a matrix fiber with thermoplastic fibers such as polypropylene to prepare a prepreg. However, in a step of co-mingling the matrix fiber with the thermoplastic fibers, some threads of the matrix fiber having a high modulus are seriously damaged such as partial breakdown in the step of co-mingling, which in turns, directly leads to a deterioration in performance of a prepreg product. Accordingly, the above prepreg is restrictedly used, hence causing a number of problems in using the same.

The extrusion method refers to a process of melting/discharging thermoplastic resins, directly applying the same to a matrix fiber, and then, impregnating the same into the matrix fiber using a hot roller. However, the thermoplastic resin has a high viscosity and, in particular, a viscosity similar to that of thermosetting resin at a high temperature of 200° C. or more. More particularly, the thermoplastic resin requires a high temperature of 200° C. or more, and tar is seriously generated due to oxidation at a high temperature while giving rise sticky property, hence causing difficulties in manufacturing high quality prepregs. In particular, due to high viscosity, it is difficult to conduct uniform impregnation into a matrix fiber of the prepreg, leading to such problems that porosity is increased and desirable performance is not sufficiently expressed. Further, there is a limitation in developing a high performance thermoplastic prepreg, since it has relatively higher content of thermoplastic resin such as 50% or more.

As another conventional technique for preparing a thermoplastic prepreg, Korean Patent Laid-Open Publication No. 2014-0005409 discloses a method for preparing a thermoplastic prepreg that includes providing a resin film having a low melting flow index and excellent impregnation and another resin film having a high melting flow index and excellent mechanical properties in order on at least one surface of a matrix fiber, heating and pressing the matrix fiber. However, the above method provides and uses two thermoplastic resin films having different melting flow indexes in order, thus complicating a manufacturing process. Further, due to a high degree of crystallization ('a crystallization degree') of the thermoplastic resin film, it is difficult to uniformly impregnate the matrix fiber with the thermoplastic resin. Further, alignment of fibers in the matrix fiber in the pressing process is modified into an undesired form, hence deteriorating physical properties.

DISCLOSURE

Technical Problem

Therefore, an object of the present invention is to provide a method for preparing a high quality thermoplastic prepreg by uniformly impregnating a matrix fiber with a thermoplastic resin.

Technical Solution

In order to accomplish the above object, the present invention provides a method for preparing a thermoplastic prepreg which includes: laminating a thermoplastic resin film having a crystallization degree in a range of 1 to 20% on at least one surface of a matrix fiber; and heating the laminate to a higher temperature than a melting point of the thermoplastic resin film then pressing the same.

Advantageous Effects

The present invention may achieve various advantages of: producing high quality thermoplastic prepreg by uniformly impregnating a matrix fiber with a thermoplastic resin; being reusable since a small amount of thermoplastic resin film is used; achieving a short curing cycle in the formation; no random modification in alignment of fibers in the matrix fiber due to a low crystallization degree of thermoplastic resin impregnated in the matrix fiber even at pressing, thereby increasing rigidity of a formed product and enabling reduction of a thickness.

BEST MODE

Hereinafter, the present invention will be described in details.

The method for preparing a thermoplastic prepreg according to the present invention is characterized by: laminating a thermoplastic resin film having a crystallization degree in a range of 1 to 20% on at least one surface of a matrix fiber; heating the laminate to a temperature higher than a melting point of the thermoplastic resin film, then, pressing the same.

The crystallization degree of the thermoplastic resin film may range from 1 to 20%, and preferably, from 3 to 12%. If the crystallization degree is less than 1%, a discharge rate and a winding rate of the thermoplastic film are substantially not different from each other, hence causing several problems during cooling and winding of the film. If the crystallization degree exceeds 20%, heat shrinkage rapidly occurs in a high crystal drawn part when the thermoplastic resin film is heated, hence causing an occurrence of irregular impregnation phenomenon of the thermoplastic resin into the matrix fiber.

The crystallization degree described above is a value measured by the following procedure.
<Procedure of Measurement of Crystallization Degree of Thermoplastic Resin Film>

5 mg of thermoplastic resin film was taken as a simple in an aluminum pan and measured using a differential scanning calorimeter. At first, after raising a temperature from room temperature to 260° C. at a rate of 10° C./minute under a nitrogen atmosphere (first run) and maintaining this temperature for 10 minutes, cooling to 20° C. at a rate of 10° C./minute and maintaining this temperature for 5 minutes, and then, raising the temperature again at a rate of 10° C./minute (second run), fusion peaks observed were divided into non-crystalline fusion peaks which existed in a temperature region of melting point (Tm)±10° C., and crystalline fusion peaks which were observed in a glass temperature (Tc) region. In this regard, a heat capacity ($\Delta Hm$) at the melting point (Tm) and a heat capacity ($\Delta Hc$) at the glass temperature (Tc) were estimated from an area surrounded by a base line and peaks, with reference to a flat part at a high temperature side, followed by estimating a theoretical heat capacity ($\Delta Hm$, Zero) of 100% crystallized thermoplastic resin film. Thereafter, a degree of crystallization was calculated according to the following Equation.

$$\text{Degree of crystallization (\%)}=[\Delta Hm-\Delta Hc]/\Delta Hm, zero \times 100$$

$\Delta Hm$: Heat capacity at a melting point (Tm)
$\Delta Hc$: Heat capacity at a glass temperature (Tc)
$\Delta Hm$, zero: Theoretical heat capacity of 100% crystallized thermoplastic resin film The thermoplastic resin film may have a thickness of 3 to 100 μm, and preferably, 7 to 65 μm. If the thickness exceeds 100 μm, the thermoplastic resin film is not uniformly molten at a contact part between the surface of the thermoplastic resin film and the surface of the matrix fiber to cause a difficulty in uniform impregnation of the thermoplastic resin into the matrix fiber. If the thickness is less than 3 μm, the thermoplastic resin film may easily tear even by a small amount of external force, hence decreasing process ability.

The present invention preferably includes laminating the thermoplastic resin film on at least one surface of a matrix fiber, heating the laminate to a temperature of 30 to 100° C. higher than a melting point of the thermoplastic resin film to endow flowability, and then, pressing the same at a pressure of 10 to 150 kg/cm.

If the heating temperature and/or pressure are lower than the above ranges, the matrix fiber may not be sufficiently impregnated with the thermoplastic resin. If the pressure is higher than the above range, a part of the matrix fiber is ruptured to deteriorate physical properties of the prepreg, while the temperature is higher than the above range, the thermoplastic resin is oxidized to deteriorate physical properties thereof, thus not being preferable.

It is preferable to adjust a weight ratio of the matrix fiber:the thermoplastic resin film to 40-90% by weight ('wt. %'):10-60 wt. %, so that process ability is improved and the matrix fiber is uniformly impregnated with the thermoplastic resin.

If the weight ratio of the thermoplastic resin film exceeds 60 wt. %, a thickness of the film is excessively increased and the thermoplastic resin film is not uniformly molten at a contact part between the surface of the thermoplastic resin film and the surface of the matrix fiber, thus causing a difficulty in uniform impregnation of the thermoplastic resin into the matrix fiber. If the weight ratio of the thermoplastic resin film is less than 10 wt. %, the thickness of the film is excessively decreased and the thermoplastic resin film may easily tear even by a small amount of external force, thus decreasing process ability.

The thermoplastic resin film may include, for example, a polyamide resin film, polypropylene resin film, polyester resin film, thermoplastic polyurethane resin film, polylactide resin film, polyethylene resin film, polybutylene terephthalate resin film, polyphenylene sulfide resin film, Teflon resin film, or polyether ether ketone film, or the like.

The thermoplastic prepreg prepared according to the present invention may have a low weight variation per unit area since the thermoplastic resin is uniformly impregnated into the matrix fiber.

In order to determine the weight variation per unit area of the thermoplastic prepreg, 10 samples having the same unit area were taken from the thermoplastic prepreg and subjected to measurement of an average weight (W0) of these 10 samples, then, a weight (W1) of the samples which exhibited the greatest difference from the average weight was substituted for Equation I or II below.

$$\text{Weight variation per unit area (\%)} = [(W0-W1)/W0] \times 100 \quad (I)$$

$$\text{Weight variation per unit are (\%)} = [(W1-W0)/W0] \times 100 \quad (II)$$

The thermoplastic prepreg prepared according to the present invention has a structure of the matrix fiber impregnated with the thermoplastic resin, and a content of thermoplastic resin in a range of 10 to 60 wt. % to a total weight of the thermoplastic prepreg.

Hereinafter, the present invention will be described in more detail with reference to the following examples and comparative examples. However, these examples are only given as preferred embodiments of the present invention and not construed to limit the scope of the present invention to be protected.

EXAMPLE 1

After laminating a polyester resin film having a crystallization degree of 4% and a thickness of 10 μm on an upper surface of a carbon fiber fabric (matrix fiber), the laminate was heated until a temperature of the polyester resin film reached 300° C., followed by pressing the same at a pressure of 20 kg/cm, thereby preparing a thermoplastic prepreg.

Herein, a weight ratio of the carbon fiber fabric:polyester resin film was adjusted to 85 wt. %:15 wt. %.

The prepared thermoplastic prepreg had a weight variation per unit area of 3%, and this demonstrated that the polyester resin was uniformly impregnated into the carbon fiber fabric.

Further, an interlayer adhesiveness between the carbon fiber fabrics (matrix fibers) included in the prepared thermoplastic prepreg was excellent as high as 55.5 MPa.

EXAMPLE 2

After laminating a polyethylene resin film having a crystallization degree of 8% and a thickness of 50 μm on an upper surface of an aramid fabric (matrix fiber), the laminate was heated until a temperature of the polyethylene resin film reached 200° C., followed by heating and pressing the same at a pressure of 80 kg/cm, thereby preparing a thermoplastic prepreg.

Herein, a weight ratio of the aramid fabric:polyethylene resin film was adjusted to 70 wt. %:30 wt. %.

The prepared thermoplastic prepreg had a weight variation per unit area of 3%, this demonstrated that the polyethylene resin was uniformly impregnated into the aramid fabric.

Further, an interlayer adhesiveness between the aramid fabrics (matrix fibers) included in the prepared thermoplastic prepreg was excellent as high as 62.8 MPa.

EXAMPLE 3

After laminating a polyamide 6 resin film having a crystallization degree of 19% and a thickness of 90 μm on an upper surface of a carbon fiber non-woven fabric (matrix fiber), the laminate was heated until a temperature of the polyamide 6 resin film reached 260° C., followed by pressing the same at a pressure of 130 kg/cm, thereby preparing a thermoplastic prepreg.

Herein, a weight ratio of the carbon fiber non-woven fabric:polyamide 6 resin film was adjusted to 45 wt. %:55 wt. %.

The prepared thermoplastic prepreg had a weight variation per unit area of 5%, this demonstrated that the polyamide 6 resin was uniformly impregnated into the carbon fiber non-woven fabric.

Further, an interlayer adhesiveness between the carbon fiber non-woven fabrics (matrix fibers) included in the prepared thermoplastic prepreg was excellent as high as 50.4 MPa.

COMPARATIVE EXAMPLE 1

After laminating a polyester resin film having a crystallization degree of 30% and a thickness of 10 μm on an upper surface of a carbon fiber fabric (matrix fiber), the laminate was heated until a temperature of the polyester resin film reached 320° C., followed by pressing the same at a pressure of 20 kg/cm, thereby preparing a thermoplastic prepreg.

Herein, a weight ratio of the carbon fiber fabric:polyester resin film was adjusted to 30 wt. %:70 wt. %. The prepared thermoplastic prepreg had a weight variation per unit area of 18%, and this demonstrated that the polyester resin was non-uniformly impregnated into the carbon fiber fabric.

Further, an interlayer adhesiveness between the carbon fiber fabrics (matrix fibers) included in the prepared thermoplastic prepreg was reduced as low as 35.8 MPa.

INDUSTRIAL APPLICABILITY

The thermoplastic prepreg prepared by the present invention may be applied to materials for helmets or materials for automobile parts, which are composed of fiber-reinforced composite materials.

The invention claimed is:

1. A method for preparing a thermoplastic prepreg, comprising:
   laminating a thermoplastic resin film having a crystallization degree in a range of 1 to 20% on at least one surface of a matrix fiber to give a laminate; and
   heating the laminate to a higher temperature than a melting point of the thermoplastic resin film, then, pressing the heated laminate,
   wherein the thermoplastic prepreg has a weight variation per unit area of 3-5%,
   said weight variation per unit area being determined by the following equation (I) or (II):

$$\text{weight variation per unit area (\%)} = [(W0-W1)/W0] \times 100 \quad (I)$$

$$\text{weight variation per unit area (\%)} = [(W1-W0)/W0] \times 100 \quad (II)$$

wherein W0 is an average weight of 10 samples of the thermoplastic prepreg, and
   W1 is a weight of the samples which show the greatest difference from the average weight W0.

2. The method according to claim 1, wherein the thermoplastic resin film has a crystallization degree of 3 to 12%.

3. The method according to claim 1, wherein the thermoplastic resin film has a thickness of 3 to 100 μm.

4. The method according to claim 1, wherein the thermoplastic resin film has a thickness of 7 to 65 μm.

5. The method according to claim 1, wherein the pressing process is executed by pressing the laminate with a pressure of 10 to 150 kg/cm at a temperature as 30 to 100° C. higher than a melting point of the thermoplastic resin film.

6. The method according to claim 1, wherein a weight ratio of the matrix fiber:the thermoplastic resin film is adjusted to 40-90 wt. %:10-60 wt. %.

7. The method according to claim 1, wherein the thermoplastic resin film is one selected from a group consisting of a polyamide resin film, polypropylene resin film, polyester resin film, thermoplastic polyurethane resin film, polylactide resin film, polyethylene resin film, polybutylene terephthalate resin film, polyphenylene sulfide resin film, Teflon resin film and polyether ether ketone resin film.

8. A thermoplastic prepreg prepared by the method according to claim 1, wherein a matrix fiber is impregnated with a thermoplastic resin,
wherein the thermoplastic prepreg has a weight variation per unit area of 3-5%,
said weight variation per unit area being determined by the following equation (I) or (II):

$$\text{weight variation per unit area (\%)} = [(W0-W1)/W0] \times 100 \quad \text{(I)}$$

$$\text{weight variation per unit area (\%)} = [(W1-W0)/W0] \times 100 \quad \text{(II)}$$

wherein W0 is an average of 10 samples of the thermoplastic prepreg, and
W1 is a weight of the samples which show the greatest difference from the average weight W0.

9. The thermoplastic prepreg according to claim 8, wherein a content of thermoplastic resin ranges from 10 to 60% by weight to a total weight of the thermoplastic prepreg.

* * * * *